June 6, 1933.  R. DIETZE  1,913,194
CONTACT MAKING INSTRUMENT AND MEASURING DEVICE
Filed Nov. 11, 1932
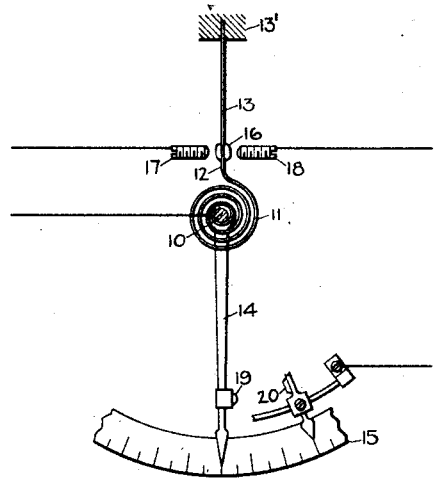
Inventor:
Richard Dietze,
by Charles E. Tullar
His Attorney.

Patented June 6, 1933

1,913,194

UNITED STATES PATENT OFFICE

RICHARD DIETZE, OF BERLIN-PANKOW, GERMANY, ASSIGNOR TO GENERAL ELECTRIC COMPANY, A CORPORATION OF NEW YORK

CONTACT-MAKING INSTRUMENT AND MEASURING DEVICE

Application filed November 11, 1932, Serial No. 642,265, and in Germany November 12, 1931.

My invention relates to contact-making instruments and measuring devices, and has for its principal object the provision of an instrument which causes contacts to be closed at predetermined scale values without interfering with the calibration or the sensitivity of the device. Other and further objects will become apparent as the description proceeds.

Instruments are known in which the pointer or some portion of the moving element may be provided with sliding contacts which are arranged to close circuits at predetermined scale positions, and contact-making devices are also known in which the contact is closed at the terminal position of the moving element. However, in the case of a sliding contact, appreciable torque is required to cause the movable contact to slide over the stationary contact, thus interfering with the sensitivity, the reliability and also with the constancy of the calibration of the instrument. Devices having contacts closed at the terminal position of the movable element cannot be used where it is desired not only to close a contact at a certain scale position, but also to obtain indications of values greater than the one corresponding to the position at which the contact is closed.

It is an object of my invention to provide an indicating or contact-making instrument in which the contact may be closed at a measured value corresponding to an intermediate scale position without appreciably altering the calibration of the instrument and without destroying its sensitivity and reliability.

In accordance with my invention in its preferred form, the movable element is biased to a predetermined position by means of a set of biasing springs comprising two or more connected parts and having a contact movably supported by one of said parts.

The features of my invention which I believe to be novel and patentable are pointed out in the claims appended hereto. A better understanding of my invention itself, however, may be obtained by referring to the following description taken in connection with the accompanying drawing which illustrates schematically one embodiment of my invention.

In the drawing, the shaft 10 represents a movable element, the other parts of which are not shown since the specific type of element employed forms no part of my invention. A biasing spring 11 which may, if desired, be of the well-known spiral type is attached at one end to the shaft 10 and at the other end to the movable end 12 of an auxiliary biasing spring 13 supported at 13' by a portion of a stationary member.

The shaft 10 carries a pointer 14 cooperating with a scale 15. The auxiliary biasing spring 13 carries at its deflecting end 12 a movable contact 16 cooperating with stationary contacts 17 and 18. If desired, the pointer 14 may also carry a movable contact 19 cooperating with an adjustable but stationary contact 20.

The operation of my device is as follows: Assuming that an increase of a positive measured quantity corresponds to counter-clockwise rotation of the movable element, when a positive torque is applied to the shaft 10 it tends to carry the spring 11 around with it in a counter-clockwise direction causing the contact 16 to move to the left against the stationary contact 17. At the same time the pointer 14 tends to move up-scale. The relative stiffnesses of springs 11 and 13 are such that at a predetermined torque or a predetermined value of the measured quantity, contacts 16 and 17 come together closing an electrical circuit. The springs 11 and 13 may, if desired, be normally biased to maintain contact 16 in a position midway between stationary contacts 17 and 18 and to maintain the pointer 14 in a zero indicating position in the middle of the scale when the torque applied to the movable element is zero. Contact will then be made with stationary contact 17 for a predetermined positive value of the measured quantity and with contact 18 for a predetermined negative value of the measured quantity. As the torque increases in the positive direction, the pointer 14 will continue to deflect up-scale and, at a given scale value for which the adjustable contact 20 is set, a circuit will be closed between contacts 19 and 20. If desired, a second adjustable contact might also be provided on the other side of the pointer 14 to close a circuit at a given negative value.

It will be understood, however, that my invention is not limited to instruments or contact-making devices responding to values reversing in direction. For example, the biasing springs might also be so arranged that movable contact 16 would be biased to a position midway between the stationary contacts 17 and 18 when the measured quantity attained a predetermined magnitude so that a circuit would be closed through contact 17 when the quantity exceeded this magnitude by a predetermined amount and through contact 18 when the measured quantity fell to a predetermined smaller magnitude. The arrangement is such that the contact 16 and the movable support 12 for spring 11 are permitted to move only a relatively short distance in either direction, and if only one stationary contact, for example, contact 17 is employed, preferably a stop to limit the motion in the opposite direction is provided in the place of the other stationary contact. It will be observed that since the support 12 of biasing spring 11 moves a relatively short distance as the movable element deflects, the reading of the instrument is substantially unaffected by adding spring 13. The very slight error could, however, be allowed for in the calibration. The provision of the contacts 16, 17 and 18 does not interfere with the deflection of the pointer 14 by adding a frictional torque, as would be the case with sliding contacts. The contacts 19 and 20 may be either of the type providing sliding engagement or the type which prevents further motion of the pointer 14. It will be seen that my invention permits the combining with contact-making arrangements of the conventional type, of means for controlling contacts at an intermediate position. It will be understood that, if desired, the auxiliary biasing spring 13 might also be supported by a third biasing spring carrying a movable contact at its movable end so that the number of scale positions at which circuits may be controlled might, if desired, be further extended.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A contact-making and indicating device comprising a stationary element, a movable element, a pointer carried thereby, a scale cooperating with said pointer, a main biasing spring carried by said movable element, an auxiliary biasing spring supported by said stationary element at one end and attached to said main biasing spring at the other end, a movable contact carried by said auxiliary biasing spring, and a stationary contact cooperating therewith, the relative stiffness of said springs being such that said contacts are closed when said movable element is subjected to a predetermined force, but permitting further deflection of said movable element in response to increased force.

2. A contact-making instrument comprising a movable element carrying a movable contact, a stationary contact cooperating therewith, a biasing spring attached to said movable element permitting said contacts to be closed when said movable element is subjected to a predetermined force, a second biasing spring fixedly supported at one end and attached to said first biasing spring at the other end, a movable contact carried by said second biasing spring, a stationary contact cooperating with said last mentioned movable contact, the arrangement being such that said second biasing spring is permitted to deflect only a relatively short distance so that the effect of the deflection of said second biasing spring in changing the point of support of said first biasing spring is relatively small and the calibration of said first set of contacts is substantially unaffected by the provision of the second set of contacts.

3. A contact-making instrument comprising a stationary element and a movable element arranged to deflect with respect to said stationary element in response to variations in the force applied to said movable element, said movable element being biased to a predetermined position by means comprising a spring arranged for a relatively small deflection supported at one end by said stationary element and a second spring arranged for greater deflection attached at one end to the movable end of said first-mentioned spring and attached at the other end to said movable element, a movable contact carried by said first biasing spring, and a stationary contact cooperating therewith, thereby permitting said contacts to be closed when said movable element is deflected a predetermined amount and permitting said movable element to be deflected further without appreciably changing the point of support of said second biasing spring so that the calibration of said instrument is substantially unaffected by said contact-making arrangement.

In witness whereof, I have hereunto set my hand.

RICHARD DIETZE.